(12) United States Patent
Stoev et al.

(10) Patent No.: US 7,489,471 B2
(45) Date of Patent: Feb. 10, 2009

(54) BIAS CALCULATION, BIAS COMPENSATION, AND BIAS TABLE EDITING METHODS FOR HDD, RECORDING MEDIA STORING COMPUTER PROGRAMS FOR EXECUTING THE SAME, AND HDD USING THE SAME

(75) Inventors: Julian Stoev, Seoul (KR); Jun-seok Shim, Seongnam-si (KR); Sang-eun Baek, Inchen Metropolitan (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 142 days.

(21) Appl. No.: 11/514,982

(22) Filed: Sep. 5, 2006

(65) Prior Publication Data

US 2007/0053095 A1    Mar. 8, 2007

(30) Foreign Application Priority Data

Sep. 5, 2005    (KR)    ............... 10-2005-0082440

(51) Int. Cl.
*G11B 5/596* (2006.01)

(52) U.S. Cl. .................... 360/78.04; 360/66
(58) Field of Classification Search .............. None
See application file for complete search history.

(56) References Cited

U.S. PATENT DOCUMENTS

| 5,773,948 | A    | 6/1998 | Kim et al. |
| 6,738,220 | B1   | 5/2004 | Codilian |
| 7,253,989 | B1 * | 8/2007 | Lau et al. ............ 360/78.04 |

FOREIGN PATENT DOCUMENTS

| KR | 100260411 B1 | 4/2000 |
| KR | 100403037 B1 | 10/2003 |

* cited by examiner

*Primary Examiner*—Jason C Olson
(74) *Attorney, Agent, or Firm*—Volentine & Whitt, PLLC

(57) ABSTRACT

In a hard disk drive (HDD), biases are measured across all zones of a disk, and nonlinear bias components are extracted. Upon a change in operational condition of the HDD, biases are measured at two reference positions on the disk so as to estimate a corresponding change in a linear bias component across all zones of the disk. The bias at a given position of the disk is then calculated based on the estimated linear bias component and the extracted nonlinear bias component.

16 Claims, 13 Drawing Sheets

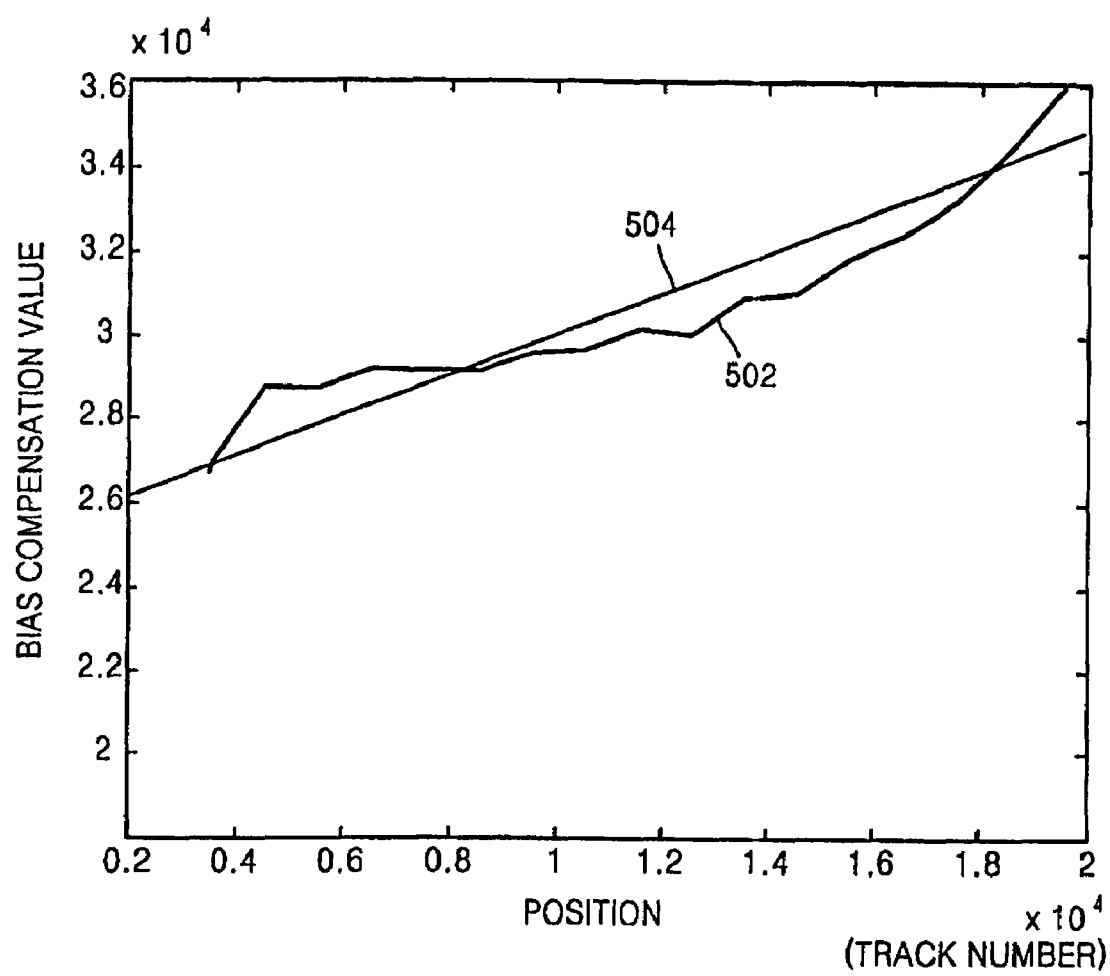

BIAS CALCULATION, BIAS COMPENSATION, AND BIAS TABLE EDITING METHODS FOR HDD, RECORDING MEDIA STORING COMPUTER PROGRAMS FOR EXECUTING THE SAME, AND HDD USING THE SAME

BACKGROUND OF THE INVENTION

1. Field of the Invention

The present invention generally relates to hard disk drives (HDDs), and more particularly, the present invention relates to bias compensation for servo control of HDDs.

A claim of priority is made to Korean Patent Application No. 10-2005-0082440, filed on Sep. 5, 2005, in the Korean Intellectual Property Office, the disclosure of which is incorporated herein in its entirety by reference.

2. Description of the Related Art

A hard disk drive (HDD) is an auxiliary storage unit of a computer system which is capable of accessing bulk data at high speed by magnetically reading/writing data from/on a rotating magnetic disk. That is, data is stored in concentric tracks formed on the magnetic disk, and the tracks are accessed by a magnetic head for writing or reading data on or from the magnetic disk. The operation of moving the magnetic head across the magnetic disk and positioning the head above one of the tracks is referred to as a "track seek" operation.

In the track seek operation, various disturbances affecting the magnetic head is referred to as a "bias". Bias forces affecting the magnetic head may include, for example, atmospheric pressure against a side surface of the head resulting from air flow generated when the disk is rotating, stresses caused by a flexible cable connected to the head, and bearing axis characteristics of a voice coil motor (VCM).

It is also known that the bias varies with a position, a moving distance, and a moving direction of the magnetic head. Therefore, for example, since an initial driving force of a voice coil varies with the position and moving direction of the magnetic head in a track seek operation, and since an initial moving speed of the magnetic head varies with the moving distance, the bias is compensated for according to the position, moving distance, and moving direction of the magnetic head. Methods of compensating for the bias are disclosed in Korean Registered Patent Nos. 403,037 and 260,411 and U.S. Pat. Nos. 5,773,948 and 6,738,220.

According to a conventional bias compensation method, a disk is divided into a plurality of zones from the inner circumference to the outer circumference, a bias is measured in each zone and stored in a bias table, and the bias is compensated for by referring to the bias table when a track seek is performed.

Since bias can vary with the operational environment, it is preferable that all biases corresponding to all zones of the disk in the bias table be updated with changes in operational environment. However, the calculations needed to update the bias table in this manner are complex and require long computation times.

SUMMARY OF THE INVENTION

According to an aspect of the present invention, a method of calculating a bias applied to a head of a hard disk drive (HDD) is provided. The method includes measuring biases across all zones of a disk, extracting a nonlinear bias component which is nonlinearly varied across all zones of the disk based on the measured biases, measuring biases at two reference positions on the disk according to a change of an operational condition of the HDD, estimating a linear bias component which is linearly varied across all zones of the disk based on the biases measured at the two reference positions, and calculating a bias at a position of the disk according to the change of the operational condition of the HDD based on the estimated linear bias component and the extracted nonlinear bias component.

According to another aspect of the present invention, a method of compensating for a bias applied to a head of a hard disk drive (HDD) is provided. The method includes measuring biases across all zones of a disk and extracting a linear bias component which is linearly changed across all zones of the disk and a nonlinear bias component which is nonlinearly changed across all zones of the disk based on the measured biases, storing the linear bias component and the nonlinear bias component in a bias table, and compensating for a bias by referring to the bias table when the HDD is turned on.

According to another aspect of the present invention, a method of editing a bias table for compensating for a bias applied to a head of a hard disk drive (HDD) is provided. The method includes measuring biases across all zones of a disk and extracting a linear bias component which is linearly changed across all zones of the disk and a nonlinear bias component which is nonlinearly changed across all zones of the disk based on the measured biases, and editing a bias table which stores the linear bias component and the nonlinear bias component.

According to another aspect of the present invention, a computer readable recording medium storing a program for executing a method of calculating a bias applied to a head of a hard disk drive (HDD), where the method includes measuring biases across all zones of a disk, extracting a nonlinear bias component which is nonlinearly varied across all zones of the disk based on the measured biases, measuring biases at two reference positions on the disk according to a change of an operational condition of the HDD, estimating a linear bias component which is linearly varied across all zones of the disk based on the biases measured at the two reference positions, and calculating a bias at a position of the disk according to the change of the operational condition of the HDD based on the estimated linear bias component and the extracted nonlinear bias component.

According to another aspect of the present invention, a computer readable recording medium storing a program for executing a method of compensating for a bias applied to a head of a hard disk drive (HDD) is provided, where the method includes measuring biases across all zones of a disk and extracting a linear bias component which is linearly changed across all zones of the disk and a nonlinear bias component which is nonlinearly changed across all zones of the disk based on the measured biases, storing the linear bias component and the nonlinear bias component in a bias table, and compensating for a bias by referring to the bias table when the HDD is turned on.

According to another aspect of the present invention, a computer readable recording medium storing a program for executing a method of editing a bias table for compensating for a bias applied to a head of a hard disk drive (HDD) is provided, where the method includes measuring biases across all zones of a disk and extracting a linear bias component which is linearly changed across all zones of the disk and a nonlinear bias component which is nonlinearly changed across all zones of the disk based on the measured biases, and editing a bias table which stores the linear bias component and the nonlinear bias component.

According to another aspect of the present invention, a hard disk drive (HDD) is provided which includes a disk which stores information, a spindle motor which rotates the disk, a head which records information on the disk and which reads information from the disk, a voice coil motor (VCM) which moves the head, a memory which stores a bias table, and a controller which measures a bias in a track and which compensates for the bias in a track seek mode by referring to the bias table stored in the memory. The memory stores a linear bias component which is linearly changed across all zones of the disk and a nonlinear bias component which is nonlinearly changed across all zones of the disk, and the controller compensates for the bias by referring to the bias table when the HDD is turned on, measures biases at reference positions on the disk when an operational condition of the HDD is changed, estimates a linear bias component changed across all zones of the disk based on biases measured at the reference positions, and updates the linear bias component stored in the bias table to the estimated linear bias component.

BRIEF DESCRIPTION OF THE DRAWINGS

The above and other aspects and features of the present invention will become readily apparent from the detailed description that follows, with reference to the accompanying drawings, in which:

FIG. 5 is a diagram for use in explaining the manner in which linear and nonlinear bias components are obtained from a bias profile;

DETAILED DESCRIPTION OF EMBODIMENTS

Figure 1:
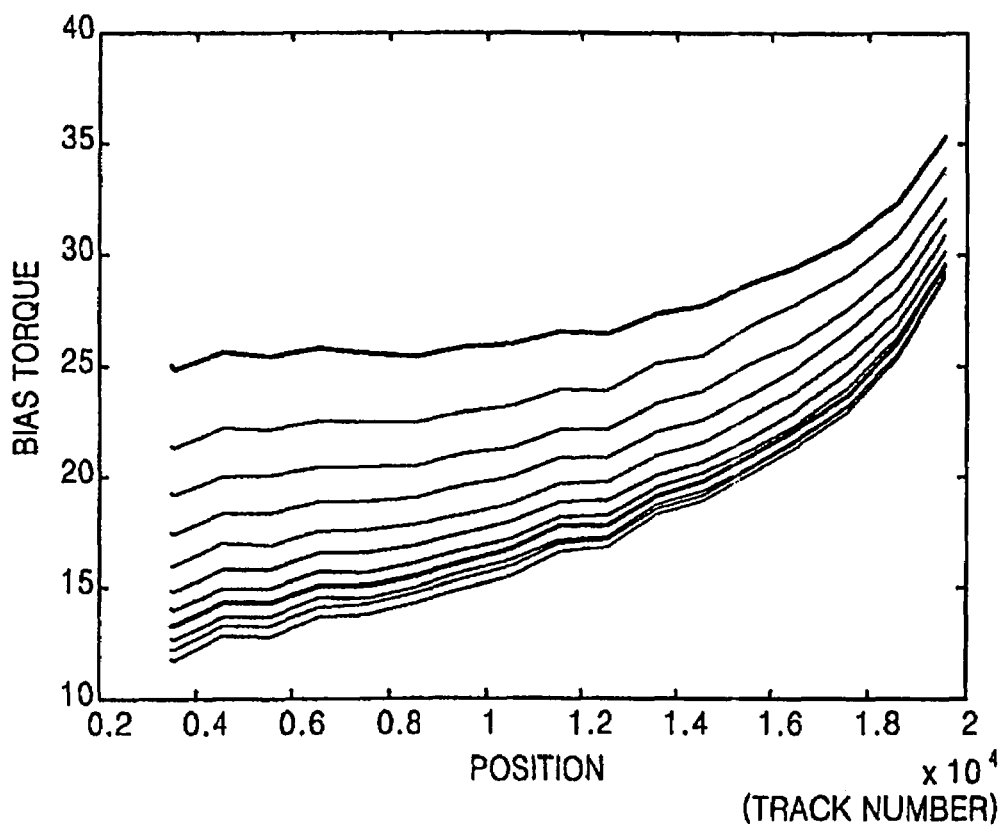
FIG. 1 illustrates bias profiles measured in an HDD.

FIG. 1 illustrates bias profiles measured in an HDD. In graph of FIG. 1, the horizontal axis denotes a head position (track number) on a disk, i.e., a distance from an inner circumference of the disk, and the vertical axis denotes the magnitude of a bias torque (in arbitrary units). As illustrated in FIG. 1, a bias profile varies according to a head position on the disk.

The bias profiles illustrated in FIG. 1 represent different usage times of the HDD. For example, the curve at the top of the graph is a bias profile immediately after the HDD is turned on, and curve at the bottom is a bias profile after the HDD has been operated for the longest time relative to the other curves. As suggested by FIG. 1, the bias converges to certain values with the passage of time.

The bias varies not only with the head position and usage time as illustrated in FIG. 1, but also with a moving direction of the head, i.e., depending on whether the head moves radially inward or outward.

Figure 2:
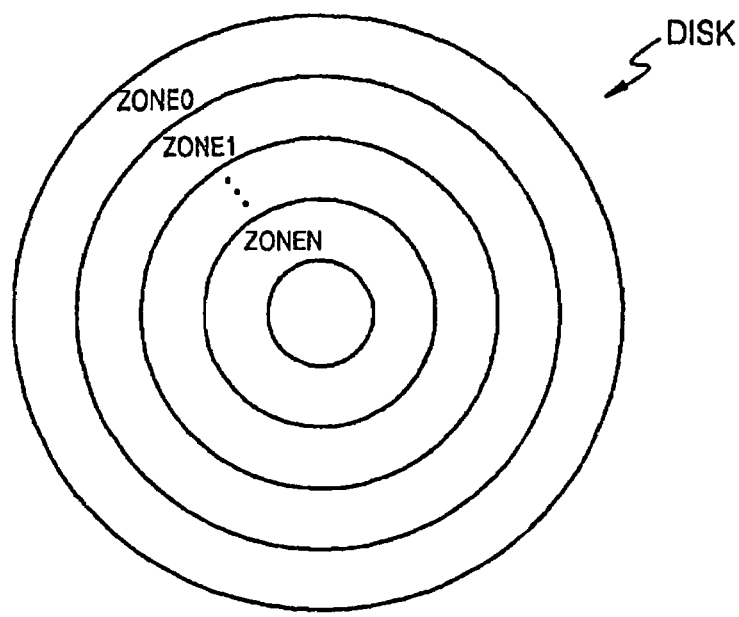
FIG. 2 illustrates zones divided on a disk in an HDD.

FIG. 2 illustrates zones divided on a disk in an HDD. It is known that the HDD is managed by dividing an area from the inner circumference of the disk to the outer circumference into a plurality zones (zone 0 to zone N). A track pitch, the number of sectors per track, and write/read parameters are set differently for each zone. A bias is also separately measured and compensated for each zone.

According to a conventional bias compensation method, a bias table containing biases obtained by measurement or estimation is stored in a memory, and the bias table is referred to when a track seek is performed. In addition, the bias table is updated by re-measuring or re-calculating biases every time a change of an operational condition, such as lapse of a usage time or a change of an operational temperature, occurs.

However, when all biases of all zones of the disk in the bias table are updated, it long computation time is needed since a bias should be newly obtained for each zone. In addition, if a bias varies nonlinearly, it takes a much longer time since an operation of applying a proportional constant according to a head position on the disk to the bias is necessary.

In a bias compensation method according to an embodiment of the present invention, a bias is compensated for by dividing the bias into a linear component, which is linearly changed across all zones of a disk, and a nonlinear component, which is nonlinearly changed across all zones of the disk, but only the linear component is compensated for when an operational condition is changed.

Based on experimental results, although both a linear component and a nonlinear component of a bias are changed when an operational condition is changed, the degree of change of the linear bias component is considerably larger than that of the nonlinear bias component. Since the nonlinear bias component variation is relatively small it can be neglected during bias compensation.

Thus, a bias can be compensated for by obtaining a non-linear component in advance and estimating only a linear component when an operational condition is changed. Since the linear bias component varies linearly across all zones of a disk, the linear bias component can be simply and quickly estimated by referring to biases measured at two arbitrary positions on the disk.

It is known that a significant source of bias is the stress of a flexible printed circuit board (FPCB) connecting a PCB in which circuit parts of the HDD are installed to a head, combined with an actuator and a mechanical shape of the actuator and the head.

The stress of the FPCB affects movement of the head since the FPCB expands or contracts when the actuator operates, and the shape of the actuator and the head also affects movement of the head in combination with air flow generated when a disk is rotated.

Although the stress of the FPCB varies with a position of the actuator (i.e., a head position on the disk) and a moving direction of the actuator (i.e., a moving direction of the head), the most significant factor is an operational temperature of the HDD. That is, when the operational temperature of the HDD varies, the stress of the FPCB varies, and accordingly, the bias applied to the head varies. The operational temperature of the HDD is strongly related to the usage time of the HDD.

A bias caused by the mechanical shape of the actuator and the head is affected by the head position on the disk and the moving direction of the head rather than the operational temperature of the HDD.

Based on the above description, a bias of the HDD can be divided into a component considerably affected by the usage time and the operational temperature and a component considerably not affected by them. It can be considered that the component considerably affected by the usage time and the operational temperature is scarcely affected by the mechanical shape of the actuator and the head, the head position on the disk, and the moving direction of the head and is linearly changed across all zones of the disk.

It can be also considered that the component considerably not affected by the usage time and the operational temperature is affected by the mechanical shape of the actuator and the head, the head position on the disk, and the moving direction of the head and is nonlinearly changed across all zones of the disk, but the level of the affection is not considerably changed with usage time and the operational temperature.

FIGS. 3A-3B and 4A-4B are diagrams for schematically explaining nonlinear bias components.

Figure 3A:
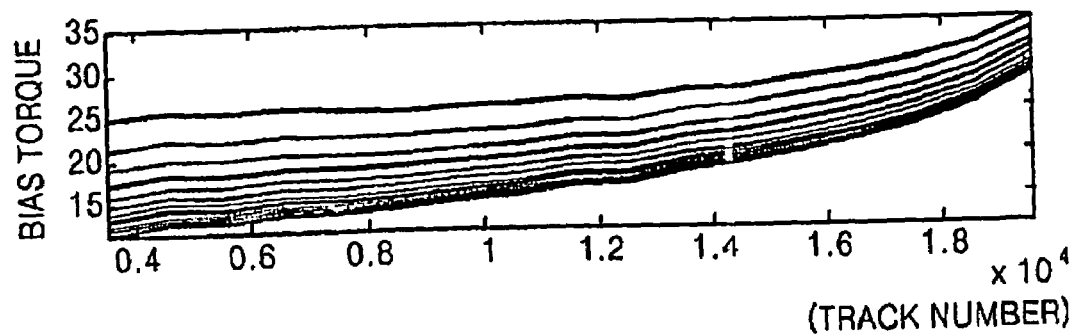
FIGS. 3A-3B and 4A-4B are diagrams for schematically explaining nonlinear bias components.
Figure 4A:
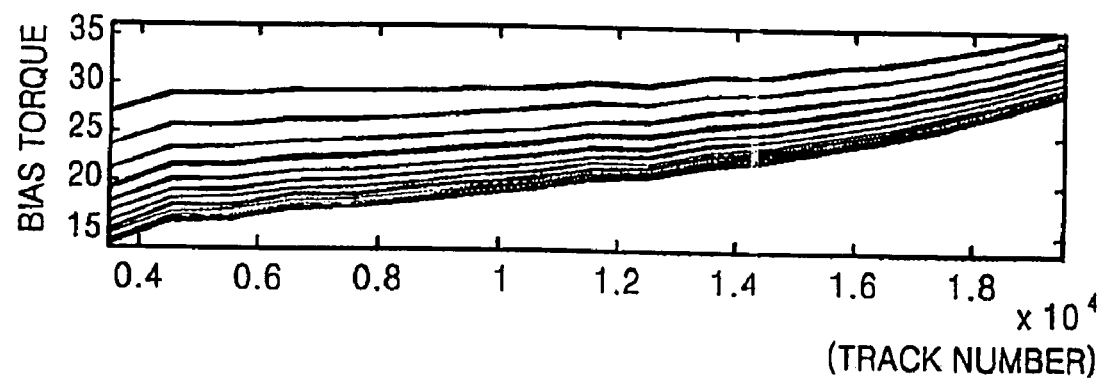

FIG. 3A illustrates a plurality of bias profiles measured at respectively different usage times while the head moves from the inner circumference to the outer circumference (i.e., radially outward), and FIG. 4A illustrates a plurality of bias profiles measured while the head moves from the outer circumference to the inner circumference (i.e., radially inward). In each of these figures, the horizontal axis denotes a head position (track number) on a disk, and the vertical axis denotes the magnitude of a bias torque (in arbitrary units).The initial bias profile in each figure was measured at the time when the HDD is initially used, i.e., when the HDD is turned on, and the remaining bias profiles were measured at constant time intervals thereafter.

Figure 3B:
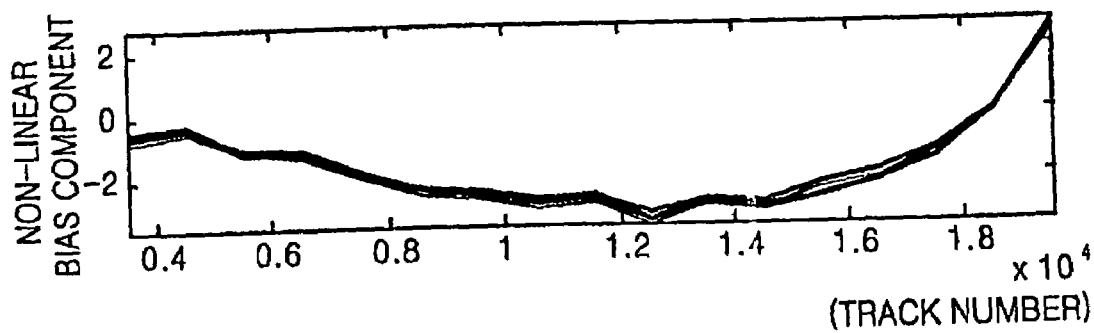
Figure 4B:
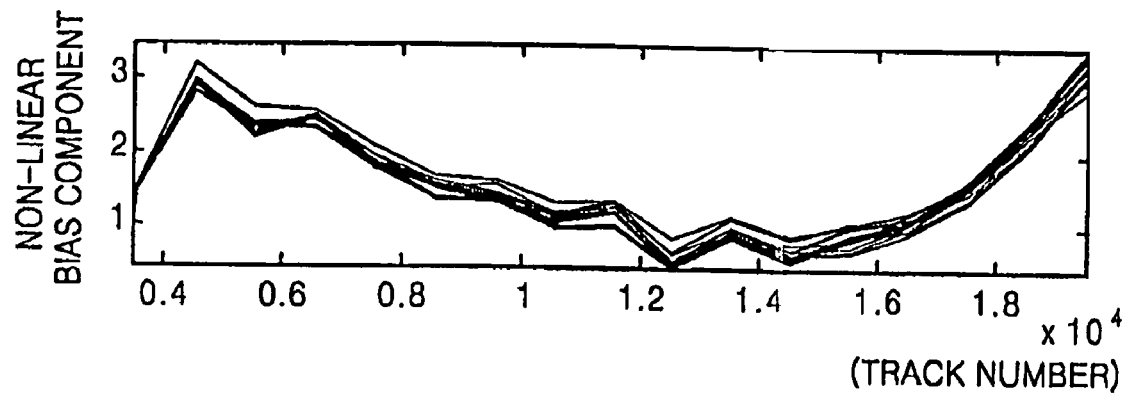

The bias profiles illustrated in FIGS. 3A and 4A include nonlinear and linear components. FIGS. 3B and 4B illustrate the nonlinear bias components corresponding to the bias profiles illustrated in FIGS. 3A and 4A. As illustrated in FIGS. 3B and 4B, very small differences exist between the nonlinear bias components according to usage time of the HDD.

Since the nonlinear bias components have very small differences with the usage time, a sufficient bias compensation performance can be obtained even though the nonlinear component is not updated with usage time.

FIG. 5 is a diagram for schematically illustrating the manner in which linear and nonlinear bias components are obtained from a bias profile. In FIG. 5, the horizontal axis denotes a head position (track number) on a disk, and the vertical axis denotes a bias compensation value (in arbitrary units). A bias profile 502 and a straight line 504 which approximates the bias profile 502 are shown in FIG. 5. Referring to FIG. 5, the bias profile 502 can be represented using the straight line 504 and a difference between the bias profile 502 and the straight line 504.

That is, a bias F is represented by $F=f(p)+0+a1p$ where p denotes a position on the disk, $f(p)$ denotes a difference value, $a0$ denotes an intercept of the straight line 504, and $a1$ denotes a slope of the straight line 504.

In the above equation, $f(p)$ is a nonlinear component of the bias, and $a1+a1p$ is a linear component of the bias.

To increase accuracy, the straight line 504 is set so that the difference value between the bias profile 502 and the straight line 504 is minimized. That is, the straight line 504 is set so that a total sum of root squares of difference values at every position on the disk is minimized.

Figure 6:
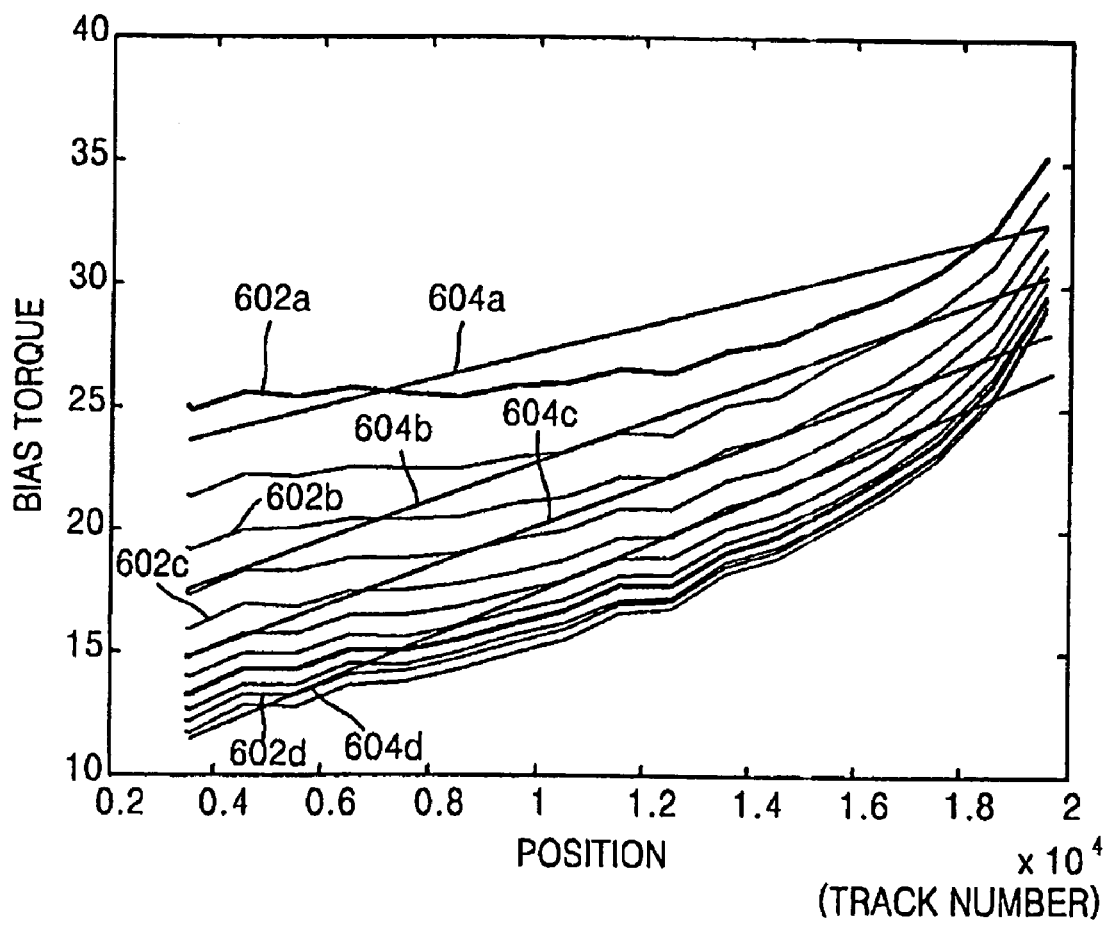
FIG. 6 is a diagram illustrating bias profiles with respect to usage time of an HDD and linear components corresponding to the measured bias profiles.

FIG. 6 is a diagram illustrating bias profiles measured with respect to a usage time of an HDD and linear components corresponding to the measured bias profiles. In FIG. 6, the horizontal axis denotes a head position (track number) on a disk, and the vertical axis denotes the magnitude of a bias torque (in arbitrary units). Bias profiles 602a through 602d of FIG. 6 are measured with respect to the usage time of the HDD, and straight lines 604a through 604d are linear components corresponding to the bias profiles 602a through 602d.

Referring to FIG. 6, as the usage time of the HDD increases, the bias profiles 602a through 602d show large differences, in contrast with the nonlinear bias components which show very little differences as previously discussed in connection with FIGS. 3B and 4B.

Thus, a bias at an arbitrary position can be calculated by obtaining nonlinear bias components in advance, estimating linear bias components according to variations of an operational condition, i.e., variations of a usage time and an operational temperature, and adding the nonlinear bias components and the linear bias components.

Figure 7:
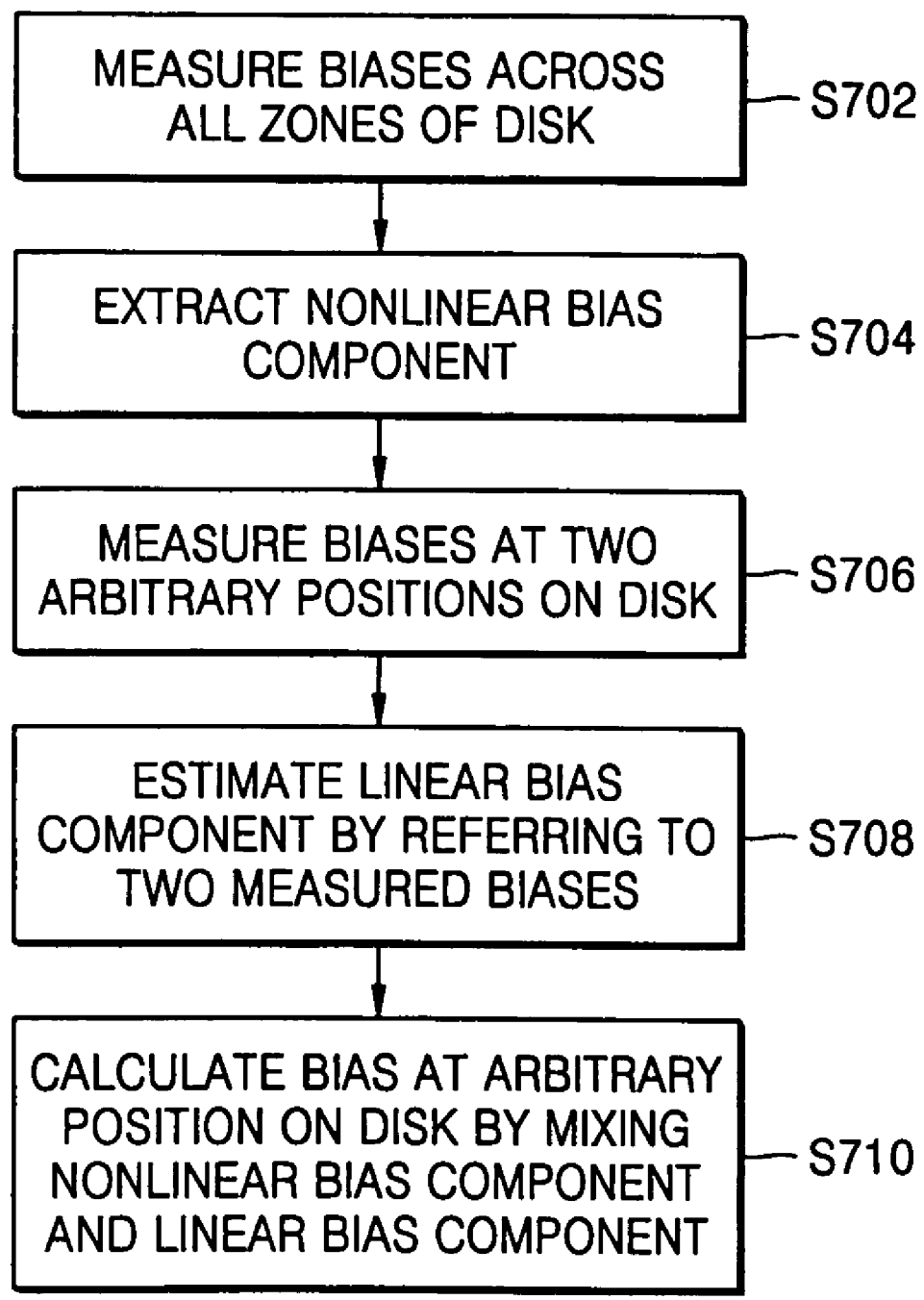
FIG. 7 is a flowchart of a bias calculation method for an HDD according to an embodiment of the present invention.

FIG. 7 is a flowchart of a bias calculation method for an HDD according to an embodiment of the present invention.

Referring to FIG. 7, a bias profile is obtained by measuring biases across all zones of a disk in operation S702.

A nonlinear bias component which is nonlinearly changed across all zones of the disk is extracted based on the measured bias profile in operation S704. The extracting of the nonlinear bias component was described previously in connection with FIG. 5. Operations S702 and S704 may be performed in a manufacturing process of the HDD, in particular, during burn-in test process. The obtained nonlinear bias component is stored in a bias table, and the bias table is stored in a maintenance cylinder of the disk.

Biases are measured at two reference positions on the disk in operation S706. The two reference positions may be arbitrarily selected.

A linear bias component which is linearly changed across all zones of the disk is estimated based on the measured biases in operation S708.

Figure 8:
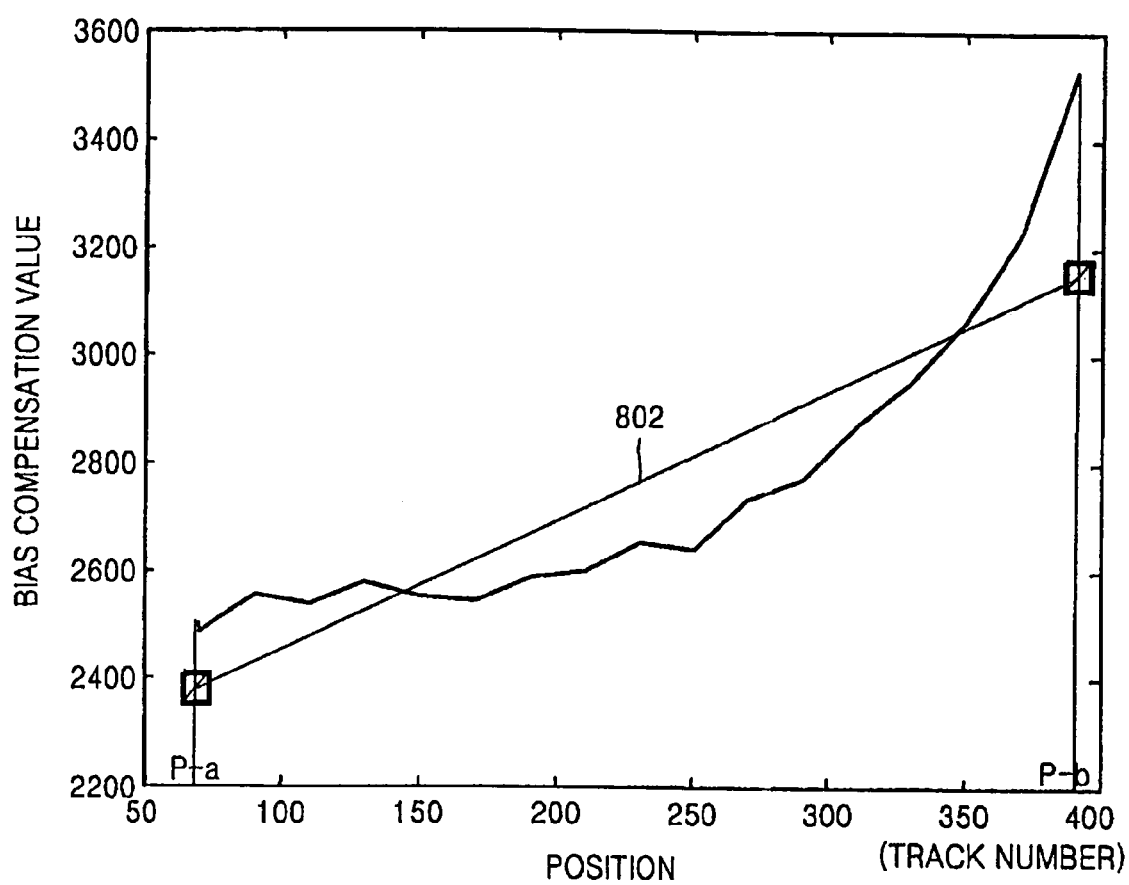
FIG. 8 schematically illustrates a method of estimating a linear bias component in the bias calculation method illustrated in FIG. 7 according to an embodiment of the present invention.

FIG. 8 schematically illustrates a method of estimating the linear bias component in the bias calculation method illustrated in FIG. 7. In FIG. 8, the horizontal axis denotes a head position (track number) on a disk, and the vertical axis denotes a bias compensation value (in arbitrary units).

As illustrated in FIG. 8, the linear bias component is represented by a straight line estimation 802 of a bias profile 801 extending between two reference positions P_a and P_b on the disk. Again, the two reference positions P_a and P_b may be arbitrarily selected.

In operation S710, a bias at a desired position on the disk is calculated based on the linear bias component estimated in operation S708 and the nonlinear bias component extracted in operation S704.

Figure 9:
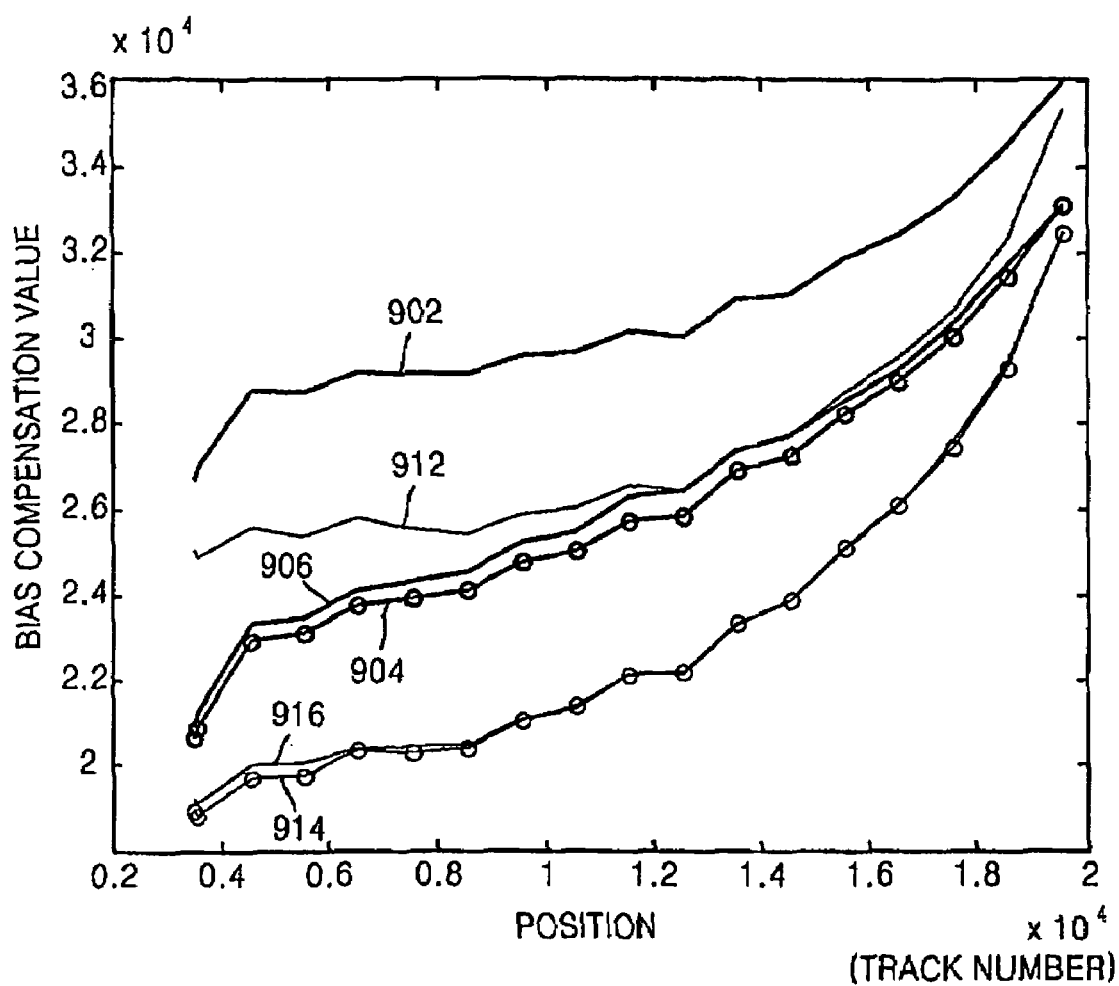
FIG. 9 illustrates an effect of a bias calculation method according to an embodiment of the present invention.

FIG. 9 illustrates an effect of the bias calculation method according to an embodiment of the present invention. In FIG. 9, the horizontal axis denotes a head position (track number) on a disk, and the vertical axis denotes a bias compensation value (in arbitrary units). Also, in FIG. 9, reference numeral 902 denotes an initial bias profile, e.g., a bias profile measured right after an HDD is turned on, reference numeral 904 denotes a bias profile calculated using the bias calculation method according to an embodiment of the present invention after a certain time, e.g., 3 minutes, since the HDD has been turned on, and reference numeral 906 denotes an actually measured bias profile corresponding to the calculated bias profile 904. Only a small difference exists between the bias profile 904 calculated using the bias calculation method according to an embodiment of the present invention and the actually measured bias profile 906.

Referring to a bias profile 912 obtained after the usage time is increased a bit and bias profiles 914 and 916 calculated and measured after a certain time, again only a small difference exists between the calculated bias profile 914 and the measured bias profile 916. This is because the bias converges as the usage time increases. Thus, the bias calculation method according to an embodiment of the present invention is more accurate as the usage time increases.

Figure 10:
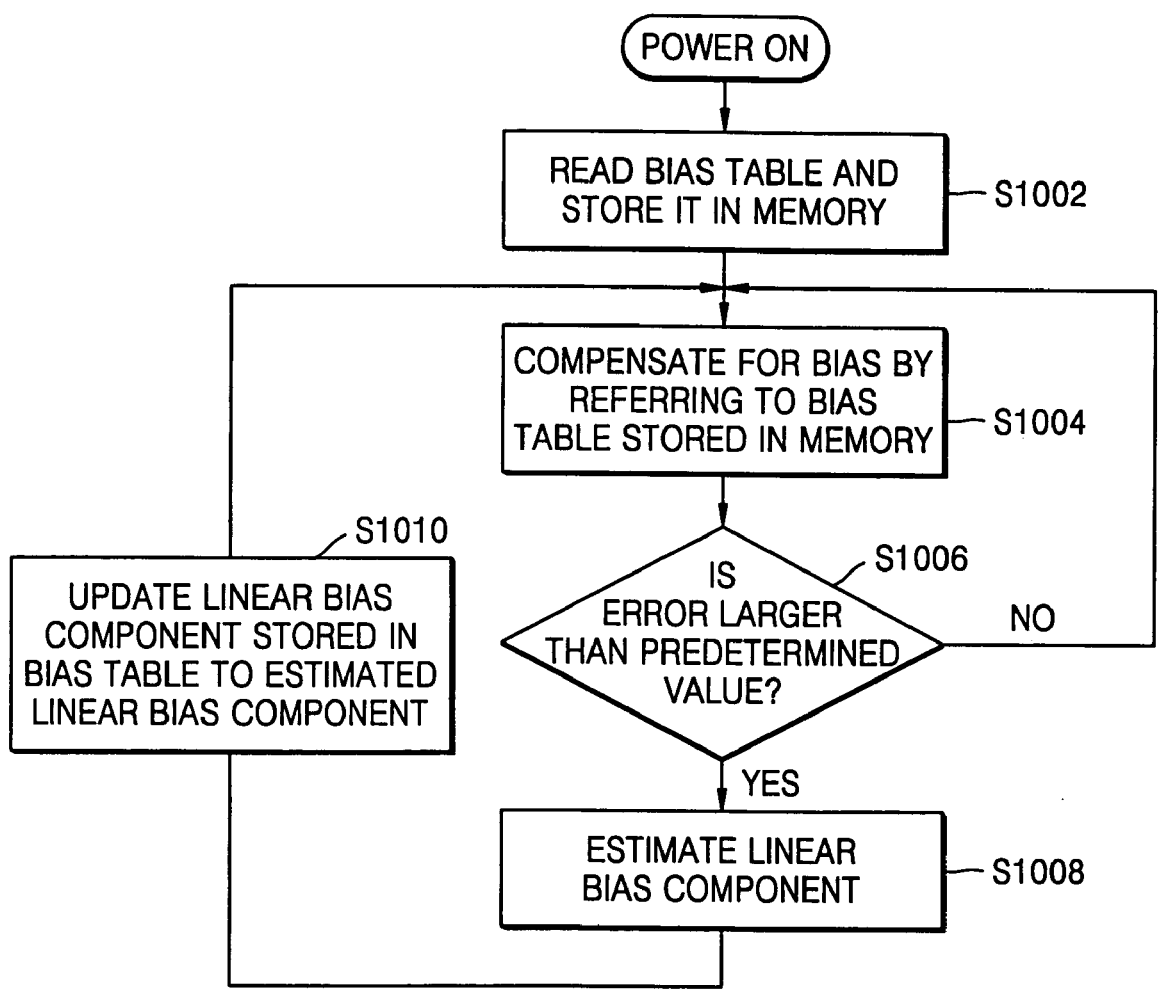
FIG. 10 is a flowchart of a bias compensation method according to an embodiment of the present invention.

FIG. 10 is a flowchart of a bias compensation method according to an embodiment of the present invention. Referring to FIG. 10, when an HDD is turned on, a bias table recorded in a maintenance cylinder of a disk is read and stored in a memory in operation S1002.

The bias table contains a nonlinear bias component and a linear bias component corresponding to an initial use. The manner of obtaining the nonlinear bias component and the linear bias component will be described in detail later.

Bias compensation is performed by referring to the initial bias table stored in the memory in operation S1004.

It is checked whether an error is larger than a predetermined value in the bias compensation in operation S1006. That is, during normal tracking of the disk, an existing closed loop controller continuously estimates the bias using, for example, integral control to obtain zero error. The error in operation S1006 is the difference between this continuously estimated bias and the value calculated in operation S1004. If the error is not larger than the predetermined value, the bias compensation is continuously performed through operation S1004.

A bias compensation value for the bias compensation is obtained by adding the nonlinear bias component and the linear bias component contained in the bias table. An equation of a straight line for representing the linear bias component is stored in the bias table, and a linear component of a bias at a certain position is obtained by substituting a head position on the disk in the equation.

The nonlinear bias component is stored in the bias table according to a head position on the disk. That is, a graph as illustrated in FIGS. 3B and 4B is stored in the bias table.

When the linear bias component at the certain position is obtained, a bias at the certain position is obtained by adding the obtained linear bias component and a nonlinear bias component at the certain position. The bias compensation is performed using the obtained bias.

If the error is larger than the predetermined value, the bias table is updated. When this happens, a bias profile to be used for the bias compensation is considerably different from a previously used bias profile, and thus the linear bias component must be updated.

Biases are measured at two arbitrary positions, and a linear bias component is estimated by referring to the measured biases in operation S1008.

The linear bias component contained in the bias table stored in the memory is updated to the estimated linear bias component in operation S1010. Thereafter, the bias compensation is performed using the updated bias table.

Figure 11:
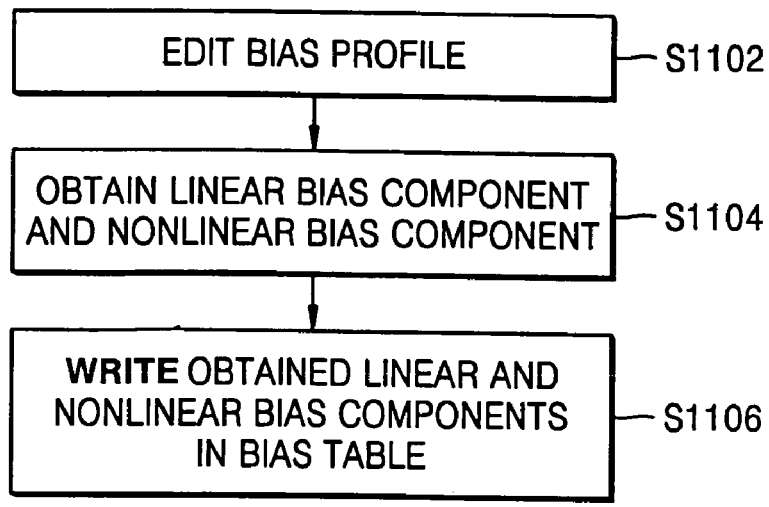
FIG. 11 is a flowchart of a method of editing a bias table according to an embodiment of the present invention.

FIG. 11 is a flowchart of a method of editing a bias table according to an embodiment of the present invention.

Referring to FIG. 11, a bias profile is edited in operation S1102. The bias profile is obtained by measuring biases across all zones of a disk while a head is being moved on the disk. Various methods of measuring the biases can exist, and the biases are simply obtained by measuring a DC component of a driving current applied to a VCM during track following.

A linear bias component and a nonlinear bias component are obtained by referring to the measured bias profile in operation 1104. How to obtain the linear bias component and the nonlinear bias component has been described in detail referring to FIG. 5.

The obtained linear bias component and nonlinear bias component are written in the bias table in operation S1106. The linear bias component is stored as an equation of a straight line obtained by referring to FIG. 5, i.e., an equation whose intercept is a0 and whose slope is a1, and the nonlinear bias component is stored according to a head position on the disk.

The bias table is stored in a maintenance cylinder of the disk or a nonvolatile memory and thereafter used by an HDD. For example, the bias table is used for bias compensation in a track seek.

Figure 12:
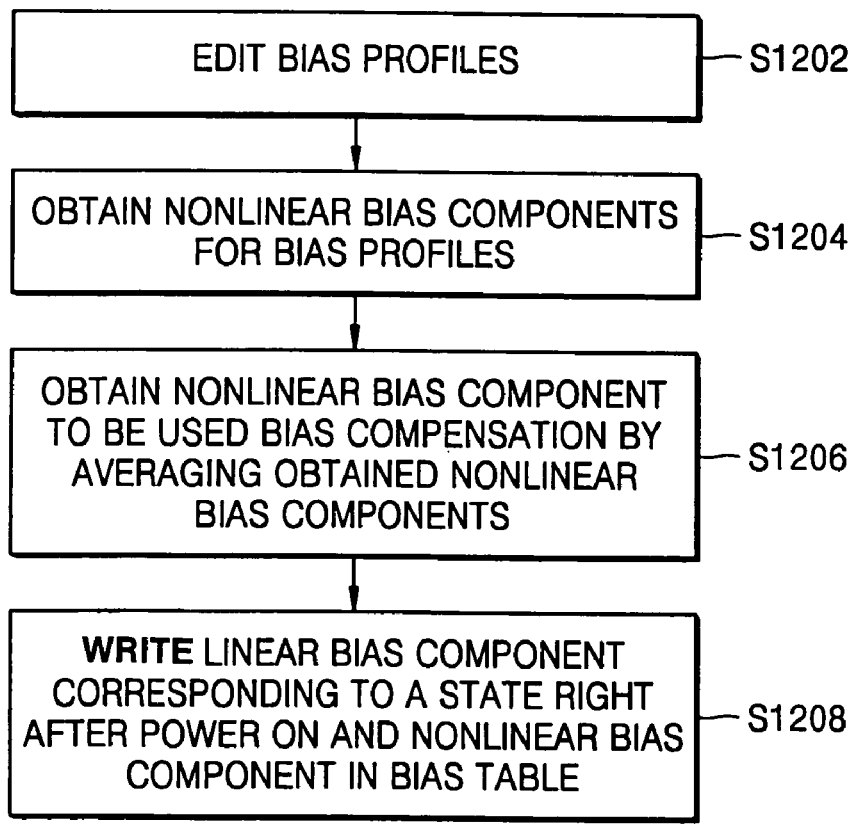
FIG. 12 is a flowchart of a method of editing a bias table according to another embodiment of the present invention.

FIG. 12 is a flowchart of a method of editing a bias table according to another embodiment of the present invention.

Referring to FIG. 12, bias profiles are edited in operation S1202. The bias profiles are obtained by measuring biases across all zones of a disk while a head is being moved on the disk and measured according to a usage time of an HDD.

Nonlinear bias components for the respective bias profiles are obtained in operation S1204.

A nonlinear bias component to be used for bias compensation is calculated by averaging the nonlinear bias components for the respective bias profiles in operation S1206.

A linear component of a bias profile obtained right after the HDD is turned on and the nonlinear bias component obtained in operation S1206 are written in the bias table in operation S1208. The linear component of the bias profile obtained right after the HDD is turned on is stored in the bias table because the bias table read from a maintenance cylinder and stored in a memory during an initial operation after turning on the HDD is used for the bias compensation.

In the method illustrated in FIG. 12, the nonlinear bias component to be used for the bias compensation uses the nonlinear bias components obtained from the bias profiles measured according to lapse of the usage time.

The bias table editing method illustrated in FIG. 11 or 12 may be performed in a manufacturing process of the HDD, in particular, in a burn-in test process.

Figure 13:
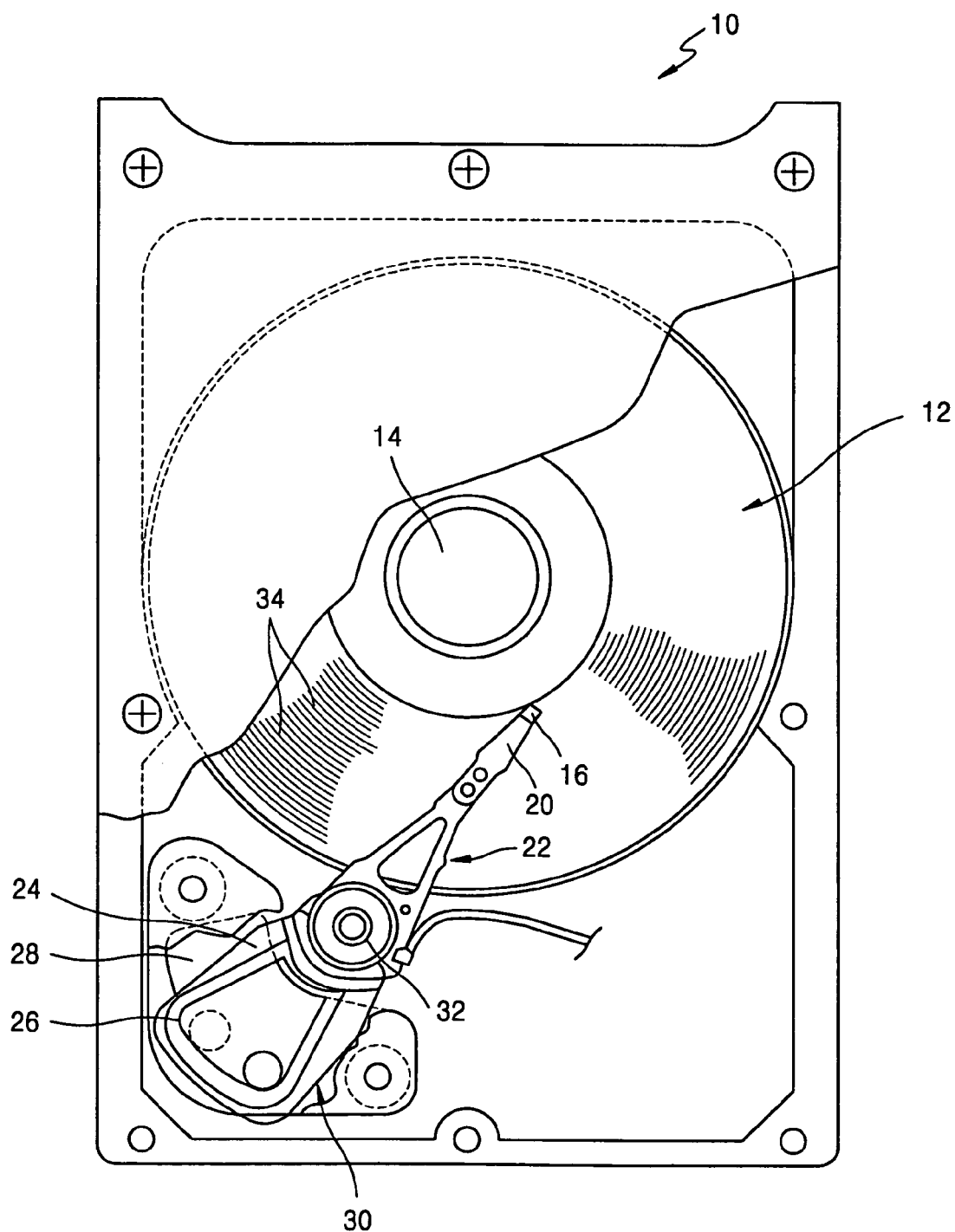
FIG. 13 is a schematic plan view of an HDD according to an embodiment of the present invention.

FIG. 13 is a schematic plan view of an HDD 10 according to an embodiment of the present invention. Referring to FIG. 13, the HDD 10 includes at least one magnetic disk 12 rotated by a spindle motor 14. The HDD 10 also includes a head 16 adjacently located to the surface of the disc 12.

The head 16 can read or write information from or to the rotating disk 12 by sensing a magnetic field formed on the disk 12 or magnetizing the disk 12. Though a single head 16 is shown in FIG. 13, the head 16 actually include a write head for magnetizing the disk 12 and a separate read head for sensing a magnetic field of the disk 12. The read head is composed of a magneto-resistive (MR) component.

The head 16 can be combined with a slider 20. The slider 20 generates an air bearing between the head 16 and the disk 12. The slider 20 is combined with a head gimbal assembly (HGA) 22. The HGA 22 is attached to an actuator arm 24 having a voice coil 26. The voice coil 26 is located adjacently to a magnetic assembly 28 specifying a voice coil motor (VCM) 30. A current supplied to the voice coil 26 generates a torque which rotates the actuator arm 24 around a bearing assembly 32. The rotation of the actuator arm 24 moves the head 16 across the disk 12.

Information is typically stored in concentric tracks 34 of the disk 12. In general, each track 34 includes a plurality of sectors. Each sector includes a data field and an identification field. The identification field is composed of a gray code for identifying sectors and tracks (cylinders). The head 16 moves across the disk 12 to read or write information from or in another track. In general, moving the head 16 to another track is called a track seek routine.

Figure 14:
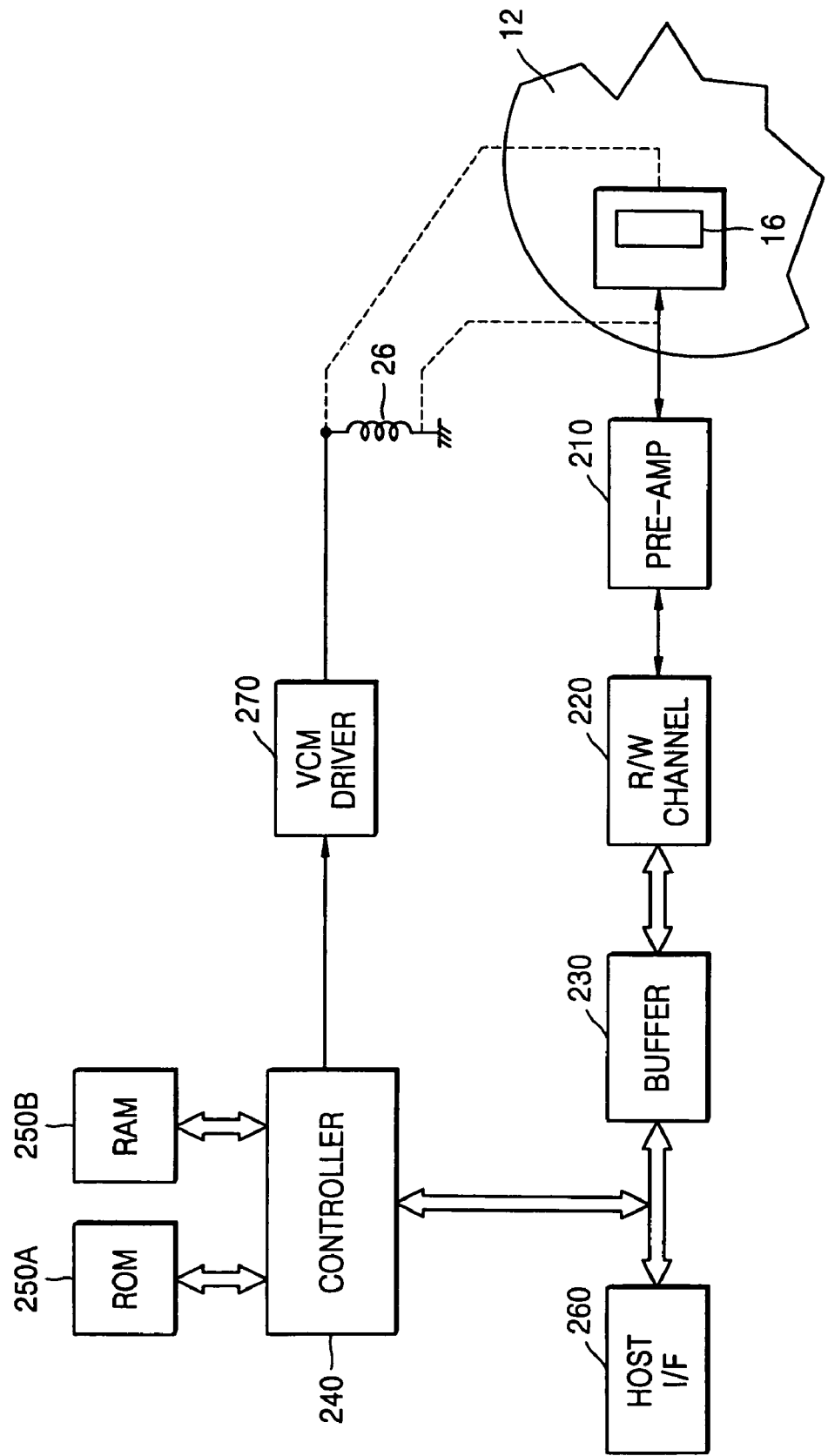
FIG. 14 is a block diagram of an electrical circuit of the HDD illustrated in FIG. 13 according to an embodiment of the present invention.

FIG. 14 is a block diagram of an electrical circuit of the HDD illustrated in FIG. 13. Referring to FIG. 14, the HDD includes a disk 12, a magnetic head 16, a pre-amplifier 210, a write/read (R/W) channel 220, a buffer 230, a controller 240, a read only memory (ROM) 250A, a random access memory (RAM) 250B, a host interface 260, a VCM driver 270.

Various commands and data used by the controller 240 to execute software routines are stored in the ROM 250A. One of the software routines is a seek control routine of compensating for a bias by referring a bias table of the HDD and moving the head 16 from one track to another. In addition, equations for generating, for example, acceleration, velocity, and position trajectories of a sine waveform for a track seek are stored in the ROM 250A.

Information required for driving the HDD, which is read from the ROM 250A or the disk 12 in an initial operation, is stored in the RAM 250B. In particular, the bias table to be referred to for bias compensation in a track seek is stored in the RAM 250B.

The controller 240 analyzes a command received from a host device (not shown) through the host interface 260 and executes a control corresponding to the analysis result. The controller 240 supplies a control signal to the VCM driver 270 to control activation of a VCM and a motion of the magnetic head 16.

A general operation of the HDD will now be described.

In a data read mode, the HDD amplifies an electrical signal sensed by the read head of the magnetic head 16 from the disk 12 using the pre-amplifier 210. The R/W channel 220 amplifies the signal amplified by the pre-amplifier 210 to a predetermined level by controlling a gain using an automatic gain control circuit (not shown), encodes the analog signal amplified to the predetermined level by the automatic gain control circuit into a digital signal readable by the host device, converts the digital signal to a data stream, temporarily stores the stream data in the buffer 230, and transmits the stream data to the host device through the host interface 260.

In a data write mode, the HDD receives data from the host device through the host interface 260, temporarily stores the received data in the buffer 230, converts the data stored in the buffer 230 to a binary data stream suitable for a write channel using the R/W channel 220 by sequentially outputting the data stored in the buffer 230, and records the binary data stream on the disk 12 through the magnetic head 16 using a write current amplified by the pre-amplifier 210.

In a track seek operation, the controller 240 calculates a seek time according to a seek distance, generates acceleration, velocity, and position trajectories based on the calculated seek time, and executes a process of controlling a driving current of the VCM. Here, the controller 240 compensates for the driving current of the VCM b referring to the bias table stored in the RAM 250B.

Figure 15:
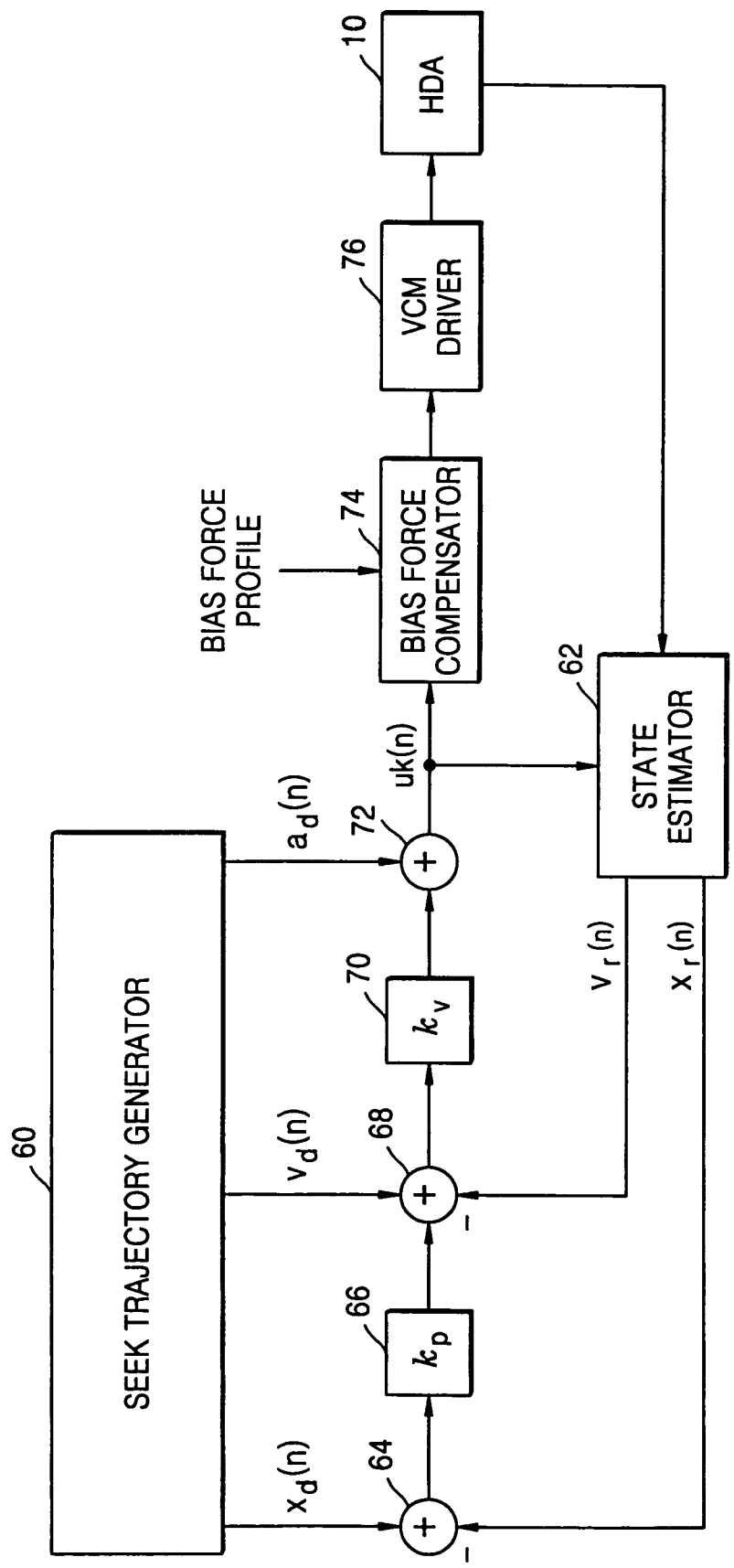
FIG. 15 is a block diagram of a track seek servo control system executed by a controller illustrated in FIG. 14 according to an embodiment of the present invention.

FIG. 15 is a block diagram of an example of a track seek servo control system including hardware and software executed by the controller 240 illustrated in FIG. 14.

Referring collectively to FIGS. 13, 14 and 15, a seek trajectory generator 60 calculates a designed position $x_d(n)$, a designed velocity $v_d(n)$, and designed acceleration $a_d(n)$ of the head 16 from an acceleration trajectory, and velocity and position trajectories obtained by integrating the acceleration trajectory of a sine wave every time the head 16 reads a gray code recorded in a track 34.

A state estimator 62 performs a process of estimating a head motion state variable value containing actual position and velocity information of the head 16 from a received position error signal and a received control signal uk using a state equation.

A first adder 64 subtracts an actual position $x_r(n)$ from the designed position $x_d(n)$. A position control gain compensator 66 generates a position compensation value by multiplying a position gain $k_p$ for position compensation by a difference between the actual position $x_r(n)$ and the designed position $x_d(n)$ calculated by the first adder 64.

A second adder 68 adds the designed velocity $v_d(n)$ to the position compensation value generated by the position control gain compensator 66 and then subtracts an actual velocity $v_r(n)$ from the added result.

A velocity control gain compensator 70 generates a velocity compensation value by multiplying a velocity gain $k_r$ for velocity compensation by the value calculated by the second adder 68.

A third adder 72 generates a seek driving current control value uk(n) by adding the velocity compensation value to the designed acceleration $a_d(n)$.

A bias force compensator 74 generates a seek driving current control value obtained by compensating for a bias according to a head position to the seek driving current control value uk(n) by referring to the bias table stored in the RAM 250B and applies the generated seek driving current control value to a VCM driver 76. The VCM driver 76 moves the head 16 by rotating the VCM by supplying a current corresponding to the bias-compensated seek driving current control value to a voice coil of a head disk assembly (HDA) 10.

Acceleration, velocity, position, and current trajectories according to a seek servo algorithm of a sine waveform can be obtained using Equation 1.

$$x(t) = K_A I_M \frac{T_{SK}}{2\pi} \left[ t - \frac{T_{SK}}{2\pi} \sin\left(\frac{2\pi}{T_{SK}} t\right) \right].$$

$$v(t) = K_A I_M \frac{T_{SK}}{2\pi} \left[ 1 - \cos\left(\frac{2\pi}{T_{SK}} t\right) \right]$$

$$a(t) = K_A I_M \sin\left(\frac{2\pi}{T_{SK}} t\right)$$

$$i(t) = I_M \sin\left(\frac{2\pi}{T_{SK}} t\right)$$

Equation 1

Here, $T_{SK}$ denotes a seek time, $I_M$ denotes a maximum current supplied to the voice coil, and $K_A$ denotes an acceleration constant.

For a given seek distance $X_{SK}$, a time t is equal to the seek time $T_{SK}$ and can be obtained using Equation 2.

$$X_{SK} = x(T_{SK}) = K_A I_M \frac{T_{SK}^2}{2\pi}$$

Equation 2

From Equation 2, the required seek time $T_{SK}$ for the given seek distance $X_{SK}$ can be obtained using Equation 3.

$$T_{SK} = \sqrt{\frac{2\pi X_{SK}}{K_A I_M}} \qquad \text{Equation 3}$$

According to Equation 3, a calculated seek trajectory of a sine wave specified by the current $I_M$ applied to the VCM is generated.

However, in reality, since a motion of the head 16 is disturbed by a bias affecting the head 16, it is necessary to compensate for the disturbance.

The controller 240 compensates for the current $I_M$ applied to the VCM by referring to the bias table stored in the RAM 250B.

To do this, as described in FIG. 9, the controller 240 stores the bias table recorded in the maintenance cylinder of the disk 12 in the RAM 250B when the HDD is turned on.

Thereafter, the controller 240 performs bias compensation by referring the bias table stored in the RAM 250B in a track seek. If an error value is larger than a predetermined value in the bias compensation, the controller 240 measures biases at two arbitrary positions on the disk 12, estimates a linear bias component using the measured biases, and updates a linear bias component stored in the RAM 250B to the estimated linear bias component.

When a track seek operation begins, the controller 240 compensates for a bias by referring to the bias profile stored in the RAM 250B.

As described above, in a bias compensation method according to an embodiment of the present invention, since a bias at an arbitrary position on a disk can be simply estimated using biases measured at two reference positions on the disk when an operational condition of an HDD is changed, bias compensation is simply and quickly achieved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of calculating a bias applied to a head of a hard disk drive (HDD), the method comprising:
   measuring biases across all zones of a disk;
   extracting a nonlinear bias component which is nonlinearly varied across all zones of the disk based on the measured biases, wherein the nonlinear bias component corresponds to a difference between the measured bias at each zone of the disk and a linear approximation of the bias across all zones of the disk;
   measuring biases at two reference positions on the disk according to a change of an operational condition of the HDD;
   estimating a linear bias component which is linearly varied across all zones of the disk based on the biases measured at the two reference positions; and
   calculating a bias at a position of the disk according to the change of the operational condition of the HDD based on the estimated linear bias component and the extracted nonlinear bias component.

2. The method of claim 1, wherein the operational condition is a usage time since the HDD has been turned on.

3. The method of claim 1, wherein the operational condition is an operational temperature of the HDD.

4. The method of claim 1, wherein the measuring of the biases across all zones of the disk and the extraction of the nonlinear bias component are performed in a manufacturing process of the HDD.

5. The method of claim 1, wherein the measuring of the biases across all zones of the disk is performed right after the HDD is turned on.

6. A method of calculating a bias applied to a head of a hard disk drive (HDD), the method comprising:
   measuring biases across all zones of a disk;
   extracting a nonlinear bias component which is nonlinearly varied across all zones of the disk based on the measured biases;
   measuring biases at two reference positions on the disk according to a change of an operational condition of the HDD;
   estimating a linear bias component which is linearly varied across all zones of the disk based on the biases measured at the two reference positions; and
   calculating a bias at a position of the disk according to the change of the operational condition of the HDD based on the estimated linear bias component and the extracted nonlinear bias component,
   wherein the extraction of the nonlinear bias component comprises:
   setting a straight line approximating the biases across all zones of the disk; and
   extracting the nonlinear bias component using differences between the biases across all zones of the disk and the straight line.

7. The method of claim 6, wherein the straight line is set so that a total sum of the differences between the biases across all zones of the disk and the straight line is minimized.

8. The method of claim 7, wherein the straight line is set so that a total sum of root squares of the differences between the biases across all zones of the disk and the straight line is minimized.

9. A method of compensating for a bias applied to a head of a hard disk drive (HDD), the method comprising:
   measuring biases across all zones of a disk and extracting a linear bias component which is linearly changed across all zones of the disk and a nonlinear bias component which is nonlinearly changed across all zones of the disk based on the measured biases, wherein the nonlinear bias component corresponds to a difference between the measured bias at each zone of the disk and a linear approximation of the biases across all zones of the disk;
   storing the linear bias component and the nonlinear bias component in a bias table; and
   compensating for a bias by referring to the bias table when the HDD is turned on.

10. The method of claim 9, further comprising:
    measuring biases at two reference positions on the disk when an operational condition of the HDD is changed;
    estimating a linear bias component changed across all zones of the disk based on the biases measured at the two positions;
    updating the linear bias component stored in the bias table to the estimated linear bias component; and
    compensating a bias by referring to the updated bias table.

11. A method of editing a bias table for compensating for a bias applied to a head of a hard disk drive (HDD), the method comprising:
    measuring biases across all zones of a disk and extracting a linear bias component which is linearly changed across all zones of the disk and a nonlinear bias component which is nonlinearly changed across all zones of the disk based on the measured biases, wherein the nonlinear bias component corresponds to a difference between the measured bias at each zone of the disk and a linear approximation of the biases across all zones of the disk; and editing a bias table which stores the linear bias component and the nonlinear bias component.

12. The method of claim 11, further comprising:

measuring biases at reference positions on the disk when an operational condition of the HDD is changed;

estimating a linear bias component changed across all zones of the disk based on biases measured at the reference positions; and updating the linear bias component stored in the bias table to the estimated linear bias component.

13. A computer readable recording medium storing a program for executing a method of calculating a bias applied to a head of a hard disk drive (HDD), the method comprising:

measuring biases across all zones of a disk;

extracting a nonlinear bias component which is nonlinearly varied across all zones of the disk based on the measured biases, wherein the nonlinear bias component corresponds to a difference between the measured bias at each zone of the disk and a linear approximation of the biases across all zones of the disk;

measuring biases at two reference positions on the disk according to a change of an operational condition of the HDD;

estimating a linear bias component which is linearly varied across all zones of the disk based on the biases measured at the two reference positions; and calculating a bias at a position of the disk according to the change of the operational condition of the HDD based on the estimated linear bias component and the extracted nonlinear bias component.

14. A computer readable recording medium storing a program for executing a method of compensating for a bias applied to a head of a hard disk drive (HDD), the method comprising:

measuring biases across all zones of a disk and extracting a linear bias component which is linearly changed across all zones of the disk and a nonlinear bias component which is nonlinearly changed across all zones of the disk based on the measured biases, wherein the nonlinear bias component corresponds to a difference between the measured bias at each zone of the disk and a linear approximation of the biases across all zones of the disk;

storing the linear bias component and the nonlinear bias component in a bias table; and compensating for a bias by referring to the bias table when the HDD is turned on.

15. A computer readable recording medium storing a program for executing a method of editing a bias table for compensating for a bias applied to a head of a hard disk drive (HDD), the method comprising:

measuring biases across all zones of a disk and extracting a linear bias component which is linearly changed across all zones of the disk and a nonlinear bias component which is nonlinearly changed across all zones of the disk based on the measured biases, wherein the nonlinear bias component corresponds to a difference between the measured bias at each zone of the disk and a linear approximation of the biases across all zones of the disk; and editing a bias table which stores the linear bias component and the nonlinear bias component.

16. A hard disk drive (HDD) comprising:

a disk which stores information;

a spindle motor which rotates the disk;

a head which records information on the disk and which reads information from the disk;

a voice coil motor (VCM) which moves the head;

a memory which stores a bias table; and a controller which measures a bias in a track and which compensates for the bias in a track seek mode by referring to the bias table stored in the memory, wherein the memory stores a linear bias component which is linearly changed across all zones of the disk and a nonlinear bias component which is nonlinearly changed across all zones of the disk, wherein the nonlinear bias component corresponds to a difference between the measured bias at each zone of the disk and a linear approximation of the biases across all zones of the disk, and the controller compensates for the bias by referring to the bias table when the HDD is turned on, measures biases at reference positions on the disk when an operational condition of the HDD is changed, estimates a linear bias component changed across all zones of the disk based on biases measured at the reference positions, and updates the linear bias component stored in the bias table to the estimated linear bias component.

* * * * *